(12) United States Patent
Doyle et al.

(10) Patent No.: US 10,021,254 B2
(45) Date of Patent: Jul. 10, 2018

(54) AUTONOMOUS VEHICLE CAMERAS USED FOR NEAR REAL-TIME IMAGING

(71) Applicant: Verizon Patent and Licensing Inc., Arlington, VA (US)

(72) Inventors: Sean Doyle, Atlanta, GA (US); James Ronald Barfield, Jr., Atlanta, GA (US); Alex D. Berkobin, Atlanta, GA (US); Thomas Steven Taylor, Atlanta, GA (US); Bryant Elliott, Atlanta, GA (US); Eric Berkobin, Atlanta, GA (US); Hamsa Ibrahim, Atlanta, GA (US); Sneha Akula, Atlanta, GA (US); Dwight Hartman, Atlanta, GA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 289 days.

(21) Appl. No.: 14/602,737

(22) Filed: Jan. 22, 2015

(65) Prior Publication Data
US 2016/0214533 A1 Jul. 28, 2016

(51) Int. Cl.
*H04N 7/18* (2006.01)
*H04N 1/00* (2006.01)

(52) U.S. Cl.
CPC ......... *H04N 1/00244* (2013.01); *H04N 7/181* (2013.01); *H04N 7/185* (2013.01)

(58) Field of Classification Search
None
See application file for complete search history.

(56) References Cited

U.S. PATENT DOCUMENTS

| 5,826,244 | A | * | 10/1998 | Huberman | G06Q 30/06 705/26.3 |
| 2014/0058855 | A1 | * | 2/2014 | Hussein | G06Q 20/405 705/16 |
| 2015/0149454 | A1 | * | 5/2015 | Hieronymus | G06K 9/6263 707/728 |
| 2016/0005229 | A1 | * | 1/2016 | Lee | G06F 3/0488 345/419 |

* cited by examiner

Primary Examiner — Dakshesh D Parikh

(57) ABSTRACT

A device may receive a request for imaging of a particular location. The device may identify one or more sensors associated with imaging the particular location. The device may select a sensor, of the one or more sensors, for imaging the particular location. The sensor may be associated with an autonomous vehicle. The device may cause the autonomous vehicle to move the sensor to the particular location. The device may receive imaging of the particular location based on causing the autonomous vehicle to move the sensor to the particular location. The device may selectively combine the imaging of the particular location with archived other imaging of the particular location. The device may provide imaging of the particular location to fulfill the request for imaging of the particular location based on selectively combining the imaging of the particular location with archived imaging of the particular location.

20 Claims, 13 Drawing Sheets

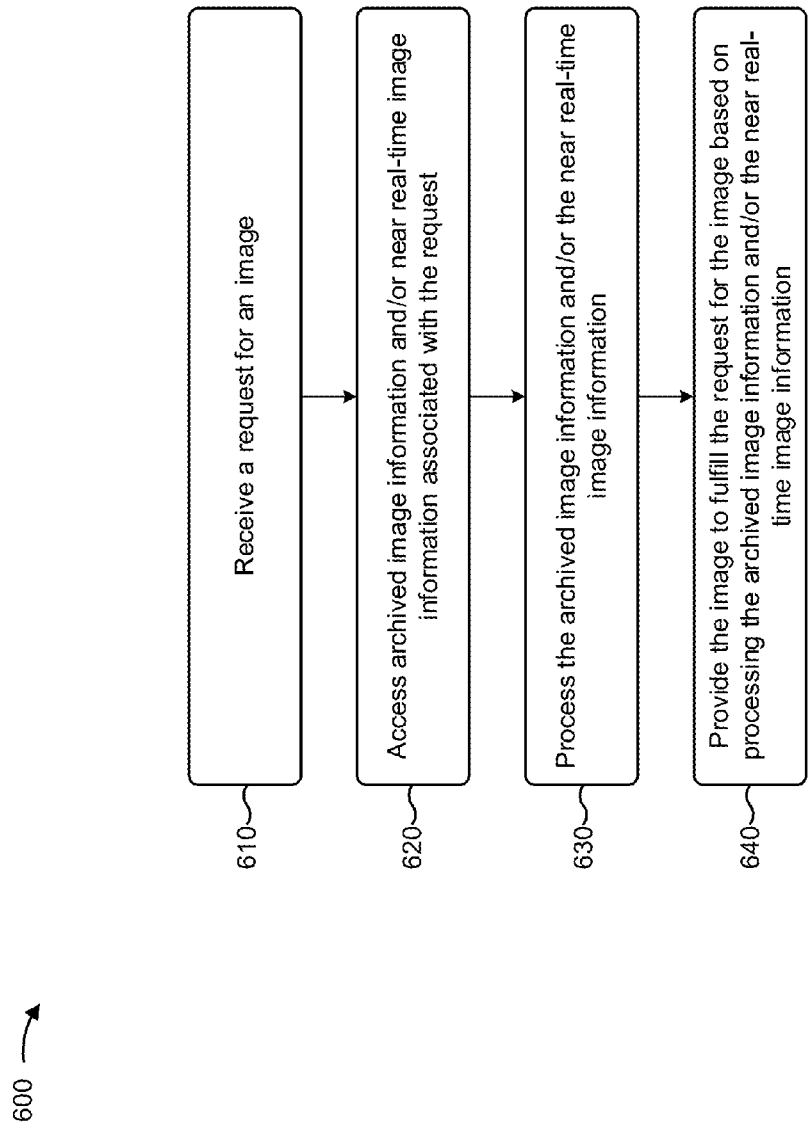

US 10,021,254 B2

AUTONOMOUS VEHICLE CAMERAS USED FOR NEAR REAL-TIME IMAGING

BACKGROUND

An image server may store a set of images of a set of locations. The image server may provide information identifying the set of locations for which an image may be provided. The image server may provide a particular image of a particular location based on a request from a user.

BRIEF DESCRIPTION OF THE DRAWINGS

FIGS. 6A and 6B are flow charts of an example process for providing image information to fulfill a request.

DETAILED DESCRIPTION OF PREFERRED EMBODIMENTS

The following detailed description of example implementations refers to the accompanying drawings. The same reference numbers in different drawings may identify the same or similar elements.

An image server may be utilized to provide an image of a location, such as a street side view of a location, a bird's-eye view of a location, or the like. The image server may store a set of images associated with a set of locations via a particular repository, and may access the repository when a user requests imaging associated with a particular location. Periodically, the image server may receive an updated image of the particular location from an imaging device, such as a vehicle with a set of cameras, or the like. However, the image server may nonetheless lack near real-time images of a particular location. Implementations, described herein, may facilitate near real-time imaging using an autonomous vehicle.

Figure 1A:
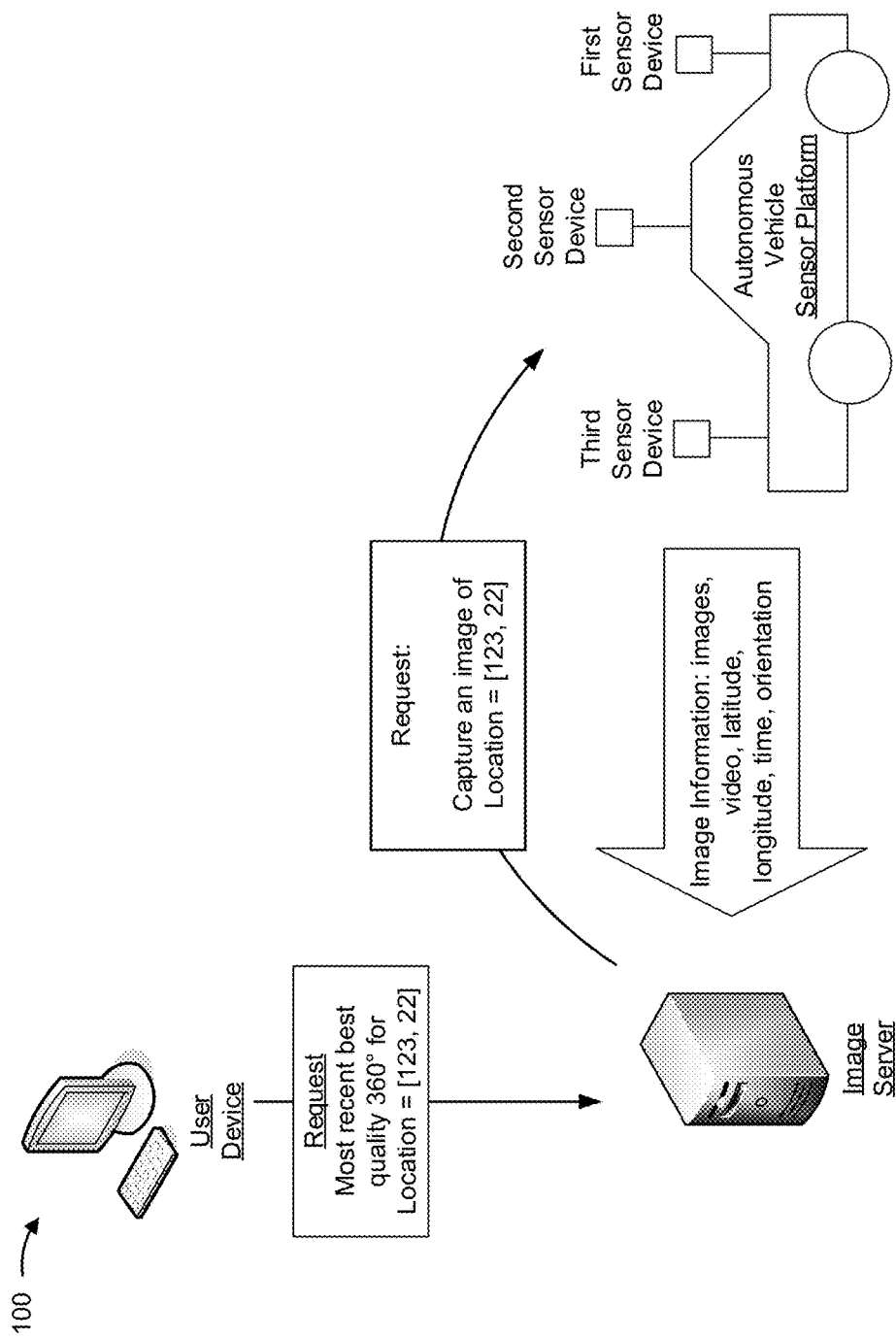
FIGS. 1A and 1B are diagrams of an overview of an example implementation described herein.
Figure 1B:
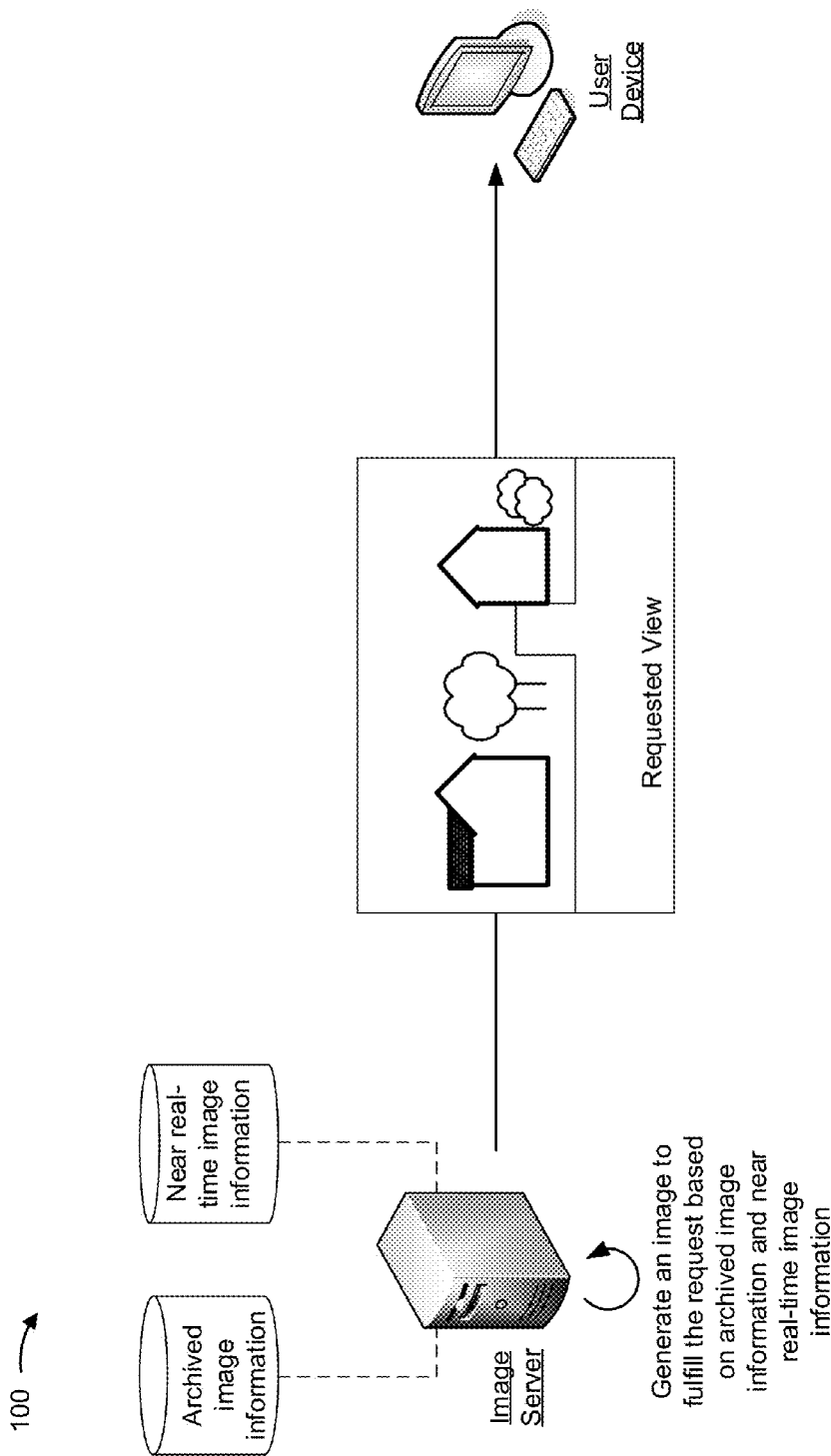

FIGS. 1A and 1B are diagrams of an overview of an example implementation 100 described herein. As shown in FIG. 1A, a user device may provide a request for imaging of a location to an image server. The request may include a set of criteria for the request, such as information identifying the location, information identifying a type of imaging being requested, information indicating whether a near real-time image (e.g., an image captured and provided in near real-time, an image captured and provided in substantially real-time, an image captured and provided in real-time, or the like) is preferred to an archived image, or the like. Additional criteria may include information requesting that the image include a particular characteristic (e.g., an image resolution, an image brightness, etc.), a particular subject matter (e.g., a person, a geographical landmark, etc.), a particular environmental condition (e.g., a particular external temperature, a particular barometric pressure, a particular precipitation level, etc.), or the like. Based on receiving the request, the image server may identify a sensor platform that includes a set of sensor devices, and may provide a request that the set of sensors provide imaging of the location. For example, the image server may cause the sensor platform to travel to the location to facilitate the set of sensor devices providing imaging of the location.

The set of sensor devices may provide image information to the image server based on receiving the request for imaging from the image server. The image information may include an image of the location, a video of the location, contextual information associated with the image that may be utilized to classify the image, such as location information, orientation information, altitude information, information identifying a time of day at which the image was captured, or the like. The image server may receive the image information from the set of sensor devices. The image server may process the image information to classify the image included in the image information with the contextual information and/or other information.

The image server may apply one or more processing techniques to process the image, such as a facial recognition technique, a sign recognition technique, a classification technique (e.g., to classify one or more objects in the image, such as people, buildings, animals, or the like), a brightness determination technique, a computer vision technique, or the like. The one or more processing techniques may include analysis of the image (e.g., analysis of properties associated with pixels of the image), segmentation and classification of the image (e.g., determining sets of related pixels and classifying the sets of pixels, such as classifying a set of pixels as an image of a boat, a person, a tree, etc.). Segmentation of the image may include a pattern recognition technique, a set of decision trees associated with performing feature extraction, a set of neural networks associated with performing feature extraction, a machine learning technique, and/or other classification techniques associated with image analysis.

As shown in FIG. 1B, the image server may access archived image information, and may utilize the near real-time image information from the set of sensor devices and the archived image information to generate a particular image to fulfill the request from the user device. For example, the image server may generate the particular image by combining multiple images of the location based on a recency of the multiple images, a quality of the multiple images, a time of day of the multiple images, or the like. Combining multiple images may include blending multiple images, such as blending an archived image and a near real-time image to generate a composite image. The image server may provide the particular image to the user device to fulfill the request. In this way, the image server may ensure that a user is provided with up-to-date images and information associated therewith, thereby enhancing the technical field of image-based mapping.

Although implementations, described herein, refer to capturing an image of a particular location, implementations, described herein, may also refer to capturing other types of data associated with a particular location, such as audio data, temperature data, weather data (e.g., temperature data, precipitation data, barometric pressure data, etc.), vehicle data (e.g., diagnostic data, engine sensor measurement data, engine diagnostic codes, etc.), social network information, or the like.

Figure 2:
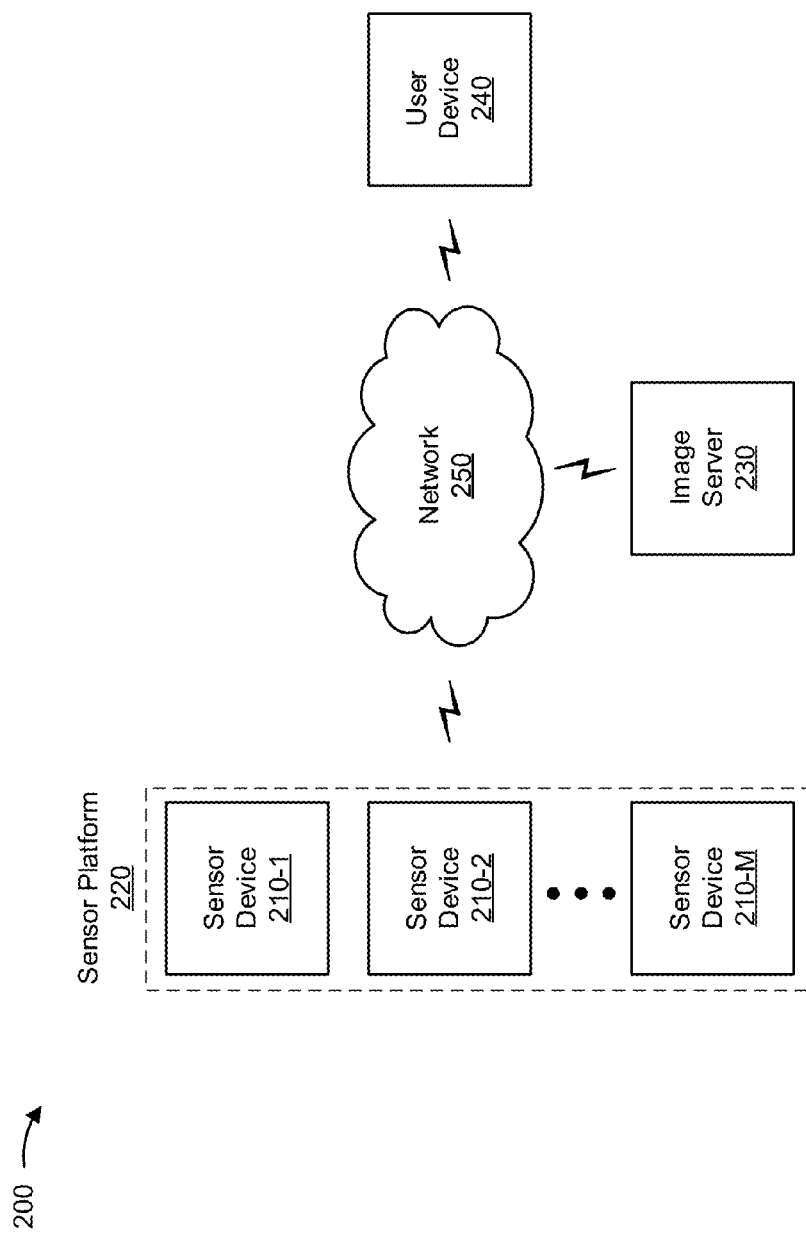
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more sensor devices 210-1 through 210-M (M≥1) (hereinafter referred to collectively as "sensor devices 210," and individually as "sensor device 210"), a sensor platform 220, an image server 230, a user device 240, and a network 250. Devices of environment 200 may interconnect via wired connections, wireless connections, or a combination of wired and wireless connections.

Sensor device 210 may include a device capable of receiving, generating, storing, processing, and/or providing image information. For example, sensor device 210 may include a photographic camera, a video camera, a radar device, a lidar device, a global positioning system (GPS) device, a thermometer, an altimeter, a barometer, a microphone, an accelerometer, a light meter, a compass, a gyroscope, a magnetometer, a sonar sensor, a Wi-Fi sensor, another device capable of providing information regarding wireless signals, or another device capable of providing an image and/or contextual information associated with a location and/or an image thereof. In some implementations, sensor device 210 may communicate with image server 230 via network 250. Additionally, or alternatively, one or more sensor devices 210 may be associated with a communication module that may facilitate communication with image server 230. In some implementations, one or more sensor devices 210 may be associated with sensor platform 220, such as a set of sensor devices 210 mounted to a vehicle, a fixed imaging platform, or the like.

Sensor platform 220 may include a platform capable of including a set of sensor devices 210 and/or one or more devices associated therewith. For example, sensor platform 220 may include a vehicle, such as an automobile (e.g., a driverless car, a driver controlled car, etc.), an airplane (e.g., an unmanned aerial vehicle (UAV), a piloted airplane, a helicopter, etc.), a boat, or the like, a fixed imaging platform, or another platform capable of being associated with one or more sensor devices 210. In some implementations, sensor platform 220 may be associated with a communication module that may permit communication with image server 230. In some implementations, sensor platform 220 may be associated with user device 240, and may request imaging (e.g., for utilization in driverless navigation, or the like) from image server 230. In some implementations, sensor platform 200 may include an autonomous vehicle. An autonomous vehicle may refer to a vehicle that utilizes computing techniques to perform navigation, object recognition, or the like to facilitate movement of the vehicle, such as a driverless car, a UAV, or the like.

Image server 230 may include one or more devices capable of storing, processing, and/or routing information associated with an image. For example, image server 230 may include a server, or a collection of servers, capable of processing an image, storing an image, requesting that a particular location be imaged, or the like. In some implementations, image server 230 may include a facial recognition module, a computer vision module, or the like. In some implementations, image server 230 may include a data structure storing information regarding a location of one or more sensor devices 210 from which image information may be requested. In some implementations, image server 230 may include a communication interface that allows image server 230 to receive information from and/or transmit information to other devices in environment 200. In some implementations, image server 230 may process and/or classify images using one or more image processing and/or image classification techniques. In some implementations, image server 230 may provide calibration information to sensor device 210, sensor platform 220, or the like to redefine a camera location, change a vehicle suspension, calibrate image stabilization, or the like.

User device 240 may include a device capable of receiving, generating, storing, processing, and/or providing information associated with a request for image information. For example, user device 240 may include a communications and/or computing device, such as a mobile phone (e.g., a smart phone, a radiotelephone, etc.), a desktop computer, a laptop computer, a tablet computer, a handheld computer, a gaming device, or a similar device associated with a particular platform (e.g., a processor of an autonomous vehicle, a processor of a drone, or the like). In some implementations, user device 240 may include a mapping software component that may utilize an image of a location when providing mapping information to a user. In some implementations, user device 240 may be associated with a human user, an artificial user (e.g., a processor of an autonomous vehicle), or the like. In some implementations, user device 240 may receive information from and/or transmit information to another device in environment 200.

Network 250 may include one or more wired and/or wireless networks. For example, network 250 may include a cellular network (e.g., a long term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, a peer-to-peer network (e.g., between multiple sensors 210, sensor platforms 220, etc.), an ad hoc network, an intranet, the Internet, a fiber optic-based network, a cloud computing network, and/or a combination of these or another type of network.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
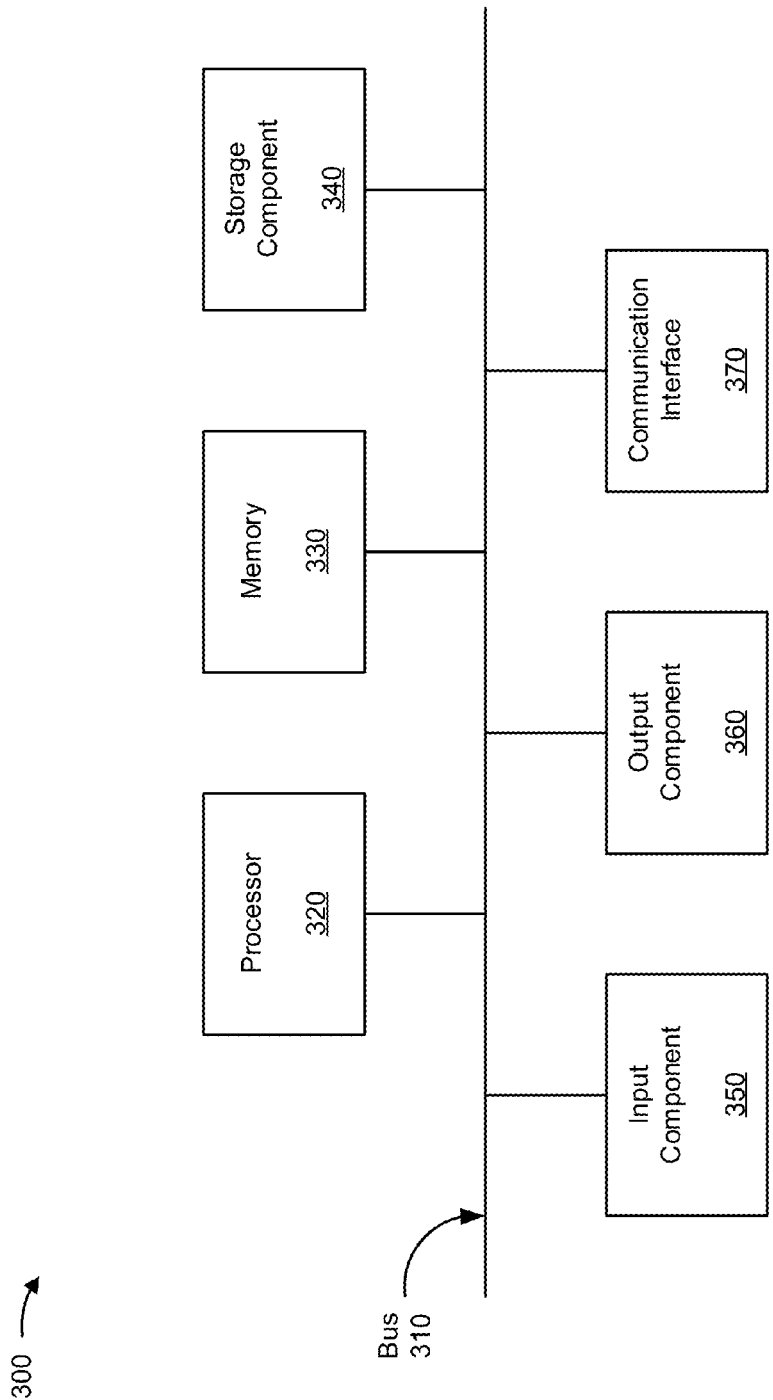
FIG. 3 is a diagram of example components of one or more devices of FIG. 2.

FIG. 3 is a diagram of example components of a device 300. Device 300 may correspond to sensor device 210, sensor platform 220, image server 230, and/or user device 240. In some implementations, sensor device 210, sensor platform 220, image server 230, and/or user device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
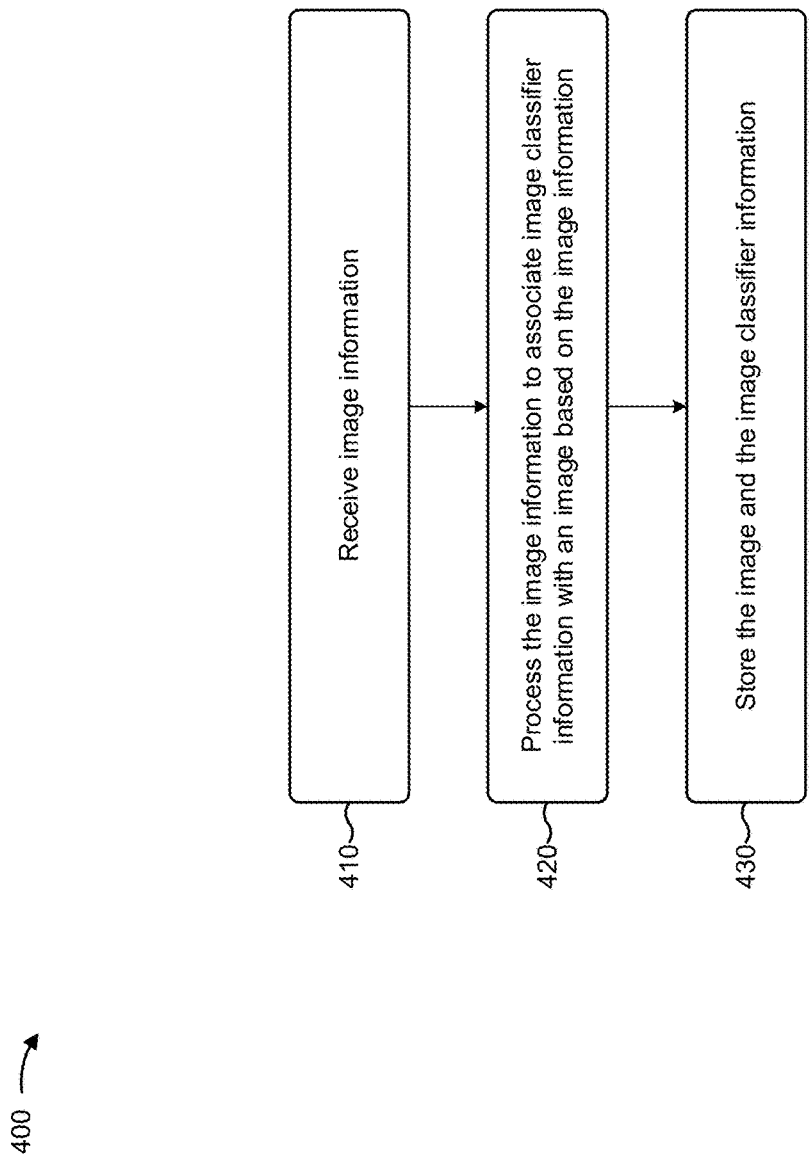
FIG. 4 is a flow chart of an example process for processing received image information.

FIG. 4 is a flow chart of an example process 400 for processing image information. In some implementations, one or more process blocks of FIG. 4 may be performed by image server 230. In some implementations, one or more process blocks of FIG. 4 may be performed by another device or a group of devices separate from or including image server 230, such as sensor device 210, sensor platform 220, and user device 240.

As shown in FIG. 4, process 400 may include receiving image information (block 410). For example, image server 230 may receive image information from sensor device 210. Image information may refer to information associated with imaging a location, such as an image, sensor information associated with the image, or the like. For example, image server 230 may receive an image of a particular location (e.g., a photographic image, a video image, or the like), and may receive sensor information associated with the image (e.g., information identifying a location of the image, information identifying an orientation of sensor device 210 when sensor device 210 captured the image, information identifying a date and/or a time at which the image was captured, or the like).

In some implementations, image server 230 may receive the image information based on requesting the image information. For example, image server 230 may receive a request for an image of a location from user device 240, may determine that sensor device 210 is located within a particular proximity of the location, and may request that sensor device 210 capture the image, as described herein with regard to FIG. 6B. Additionally, or alternatively, image server 230 may receive the image information based on the image information being captured. For example, one or more sensor devices 210 associated with sensor platform 220 may capture a set of images associated with a set of locations, and may provide image information associated with the set of images when the set of images are captured.

In some implementations, image server 230 may filter image information that is received. For example, when image server 230 receives image information from multiple sensor devices 210, image server 230 may determine that certain image information is to be further processed and other image information is to be discarded. In some implementations, image server 230 may filter the image information based on determining whether similar image information is already stored via an archive. For example, image server 230 may receive a new image of a particular location, and may determine whether a data structure stores other images of the particular location. In this case, if image server 230 determines that the data structure already stores an image of the particular location that was captured within a threshold period of time, image server 230 may discard the new image of the particular location. Additionally, or alternatively, if image server 230 determines that the image of the particular location stored by the data structure was captured beyond the threshold period of time, image server 230 may process and/or store the image as described herein.

In some implementations, image server 230 may cause sensor device 210 to store information associated with the image. For example, image server 230 may cause sensor device 210 to maintain a buffer of image information captured via sensor device 210, and may request that sensor device 210 periodically provide information from the buffer to image server 230. In this way, image server 230 may distribute storage of image information to sensor devices 210, thereby obviating the need for data structures capable of storing all image information captured by all sensor devices 210 associated with image server 230. In this case, image server 230 may maintain information identifying image information stored by sensor devices 210, and may, for example, request that a particular sensor device 210 provide image information stored by the particular sensor device 210.

As further shown in FIG. 4, process 400 may include processing the image information to associate image classifier information with an image based on the image information (block 420). For example, image server 230 may process the image information, associated with an image, to selectively associate the image classifier information with the image based on the image information. Image classifier information may refer to information associated with the image, such as other information from sensor device 210 (e.g., contextual information, such as location information, orientation information, atmospheric information, or the like), information determined based on processing the image (e.g., information regarding image content, image quality, image size, or the like), or other similar metadata.

In some implementations, image server 230 may associate other information from sensor device 210 with the image. For example, when image server 230 receives image information from sensor device 210 (e.g., from sensor device 210, from a set of sensor devices 210, etc.) that includes an image and other sensor information (e.g., location information, an orientation, or the like), image server 230 may associate the image with the other sensor information, such as by including metadata in information storing the image. In some implementations, image server 230 may associate other information from sensor device 210 with one or more images of a set of images. For example, when image server 230 receives a video image from sensor 210 and other image information classifying the video image, image server 230 may process the video image to associate the other information with one or more image frames of the video image, such as by associating the other information with a first frame of the video image, associating the other information with alternative frames of the video image, or the like.

Image server 230 may process the image to determine information that may be associated with the image, in some implementations. For example, image server 230 may perform facial recognition on the image to determine one or more persons included in the image, and may associate information identifying the one or more persons with the image. Additionally, or alternatively, image server 230 may perform another image recognition technique, such as determining a street number on a house in the image, identifying environmental aspects of the image (e.g., identifying a mountain, a river, a skyline, or the like), identifying objects in the image (e.g., identifying a building, a type of animal, a type of tree, a traffic light, a stop sign, or the like), or the like.

Additionally, or alternatively, image server 230 may process the image to classify the image according to one or more properties of the image. For example, image server 230 may determine an image quality, an image size, an image aspect ratio, an image brightness, an image clarity, or the like, and may store an association between the image and the one or more properties of the image. In this way, image server 230 may provide images that best match a request for imaging which includes a set of criteria regarding the request for imaging. In some implementations, image server 230 may generate calibration information based on processing the image, such as information associated with improving another image from sensor device 210, or the like.

Image server 230 may determine an image score associated with the image, in some implementations. For example, image server 230 may rate the image according to one or more image metrics, such as an image quality metric, an image recency metric, or the like. In some implementations, image server 230 may determine whether to include an image in a repository storing processed images based on the image score. For example, image server 230 may discard images that fail to satisfy a threshold score. In this way, image server 230 may determine which images to maintain in a repository, and may select which particular image of a set of images of the same location to provide upon request.

As further shown in FIG. 4, process 400 may include storing the image and the image classifier information (block 430). For example, image server 230 may store the image and the image classifier information via a data structure. In some implementations, image server 230 may store metadata associated with facilitating a search of the data structure for the image, such as information identifying a location at which the image was captured, or the like. In some implementations, one or more image servers 230 may be associated with a centralized data structure, and may provide one or more images and associated image classifier information to the centralized data structure for storage. Additionally, or alternatively, one or more image servers 230 may utilize a decentralized data structure to store one or more images and associated image classifier information. For example, image server 230 may store the one or more images and the associated image classifier information via one or more data structures respectively associated with the one or more image servers 230, one or more data structures associated with one or more sensor devices 210 and/or one or more sensor platforms 220, or the like.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
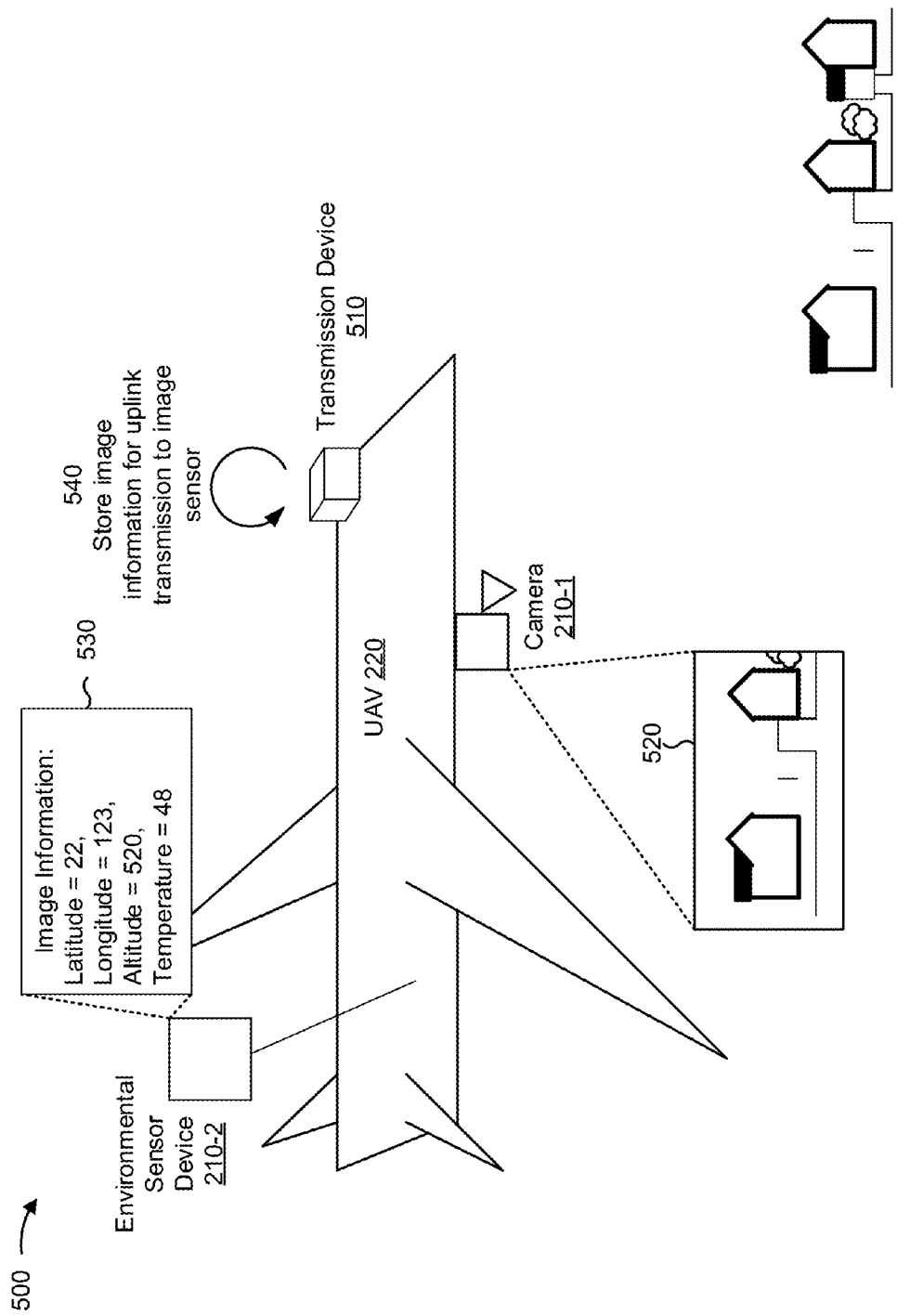
FIGS. 5A and 5B are diagrams of an example implementation relating to the example process shown in FIG. 4.
Figure 5B:
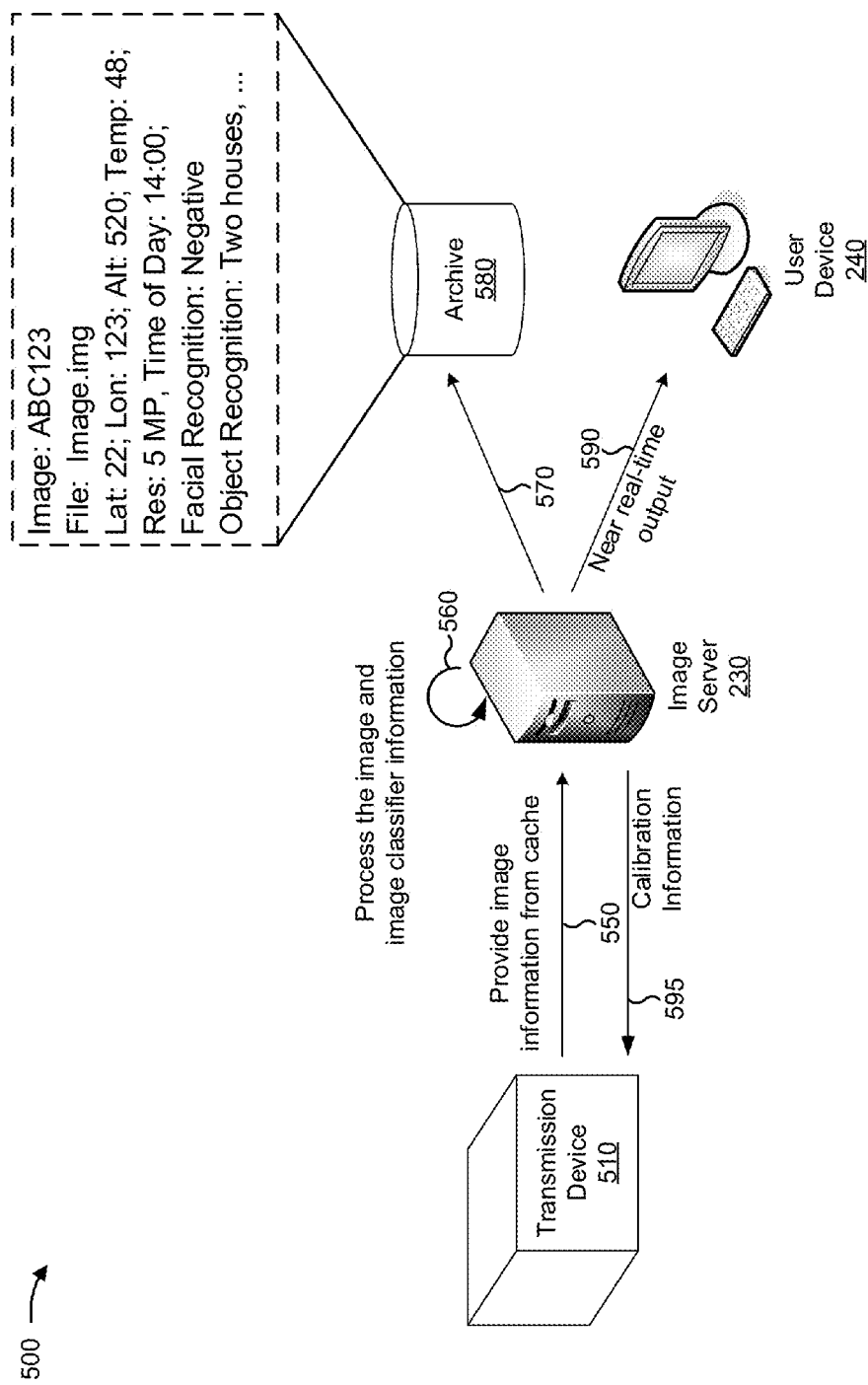

FIGS. 5A and 5B are diagrams of an example implementation 500 relating to example process 400 shown in FIG. 4. FIGS. 5A and 5B show an example of processing image information.

As shown in FIG. 5A, a set of sensor devices 210 (e.g., camera 210-1 and environmental sensor device 210-2) may be associated with unmanned aerial vehicle (UAV) 220 (e.g., a particular sensor platform 220). UAV 220 may include transmission device 510 (e.g., a control device associated with providing image information from the set of sensor devices 210 to image server 230). As shown by reference number 520, camera 210-1 captures first image information to be provided to transmission device 510 (e.g., an image file), and as shown by reference number 530, environmental sensor device 210-2 captures second image information to be provided to transmission device 510 (e.g., a set of sensor measurements, such as a latitude measurement, a longitude measurement, an altitude measurement, and a temperature measurement). Assume that camera 210-1 and environmental sensor device 210-2 provide the first image information and the second image information, respectively, to transmission device 510. As shown by reference number 540, transmission device 510 stores the first image information and the second image information for transmission to image server 230.

As shown in FIG. 5B, transmission device 510 may provide (e.g., via a cellular connection using network 250) the stored image information to image server 230. As shown by reference number 560, image server 230 processes the first image information and the second image information to classify the image (e.g., creating image classifier information). For example, assume that image server 230 determines an image resolution and a time of day associated with the image. Further assume, for example, that image server 230 performs facial recognition and fails to identify any faces in the image, and image server 230 performs object recognition and identifies two houses as present in the image. As shown by reference number 570, image server 230 stores the image and image classifier information via archive 580 (e.g., information identifying the image, the information identifying the latitude, longitude, etc., the information determined based on processing the image, such as information regarding the image resolution, the time of day, and the two houses). As shown by reference number 590, image server 230 provides near real-time output of the image and the image classifier information to user device 240. As shown by reference number 595, image server 230 may, based on processing the near real-time output of the image, provide calibration information to camera 210-1 and/or environmental sensor 210-2 via transmission device 510. For example, image server 230 may provide calibration information indicating that a person has entered a field of vision of camera 210-1 and instructing camera 210-1 to track the person. In another example, image server 230 may provide calibration information instructing UAV 220 to adjust altitude to improve image quality, to end imaging because of poor visibility, or the like.

As indicated above, FIGS. 5A and 5B are provided merely as an example. Other examples are possible and may differ from what was described with regard to FIGS. 5A and 5B.

Figure 6B:
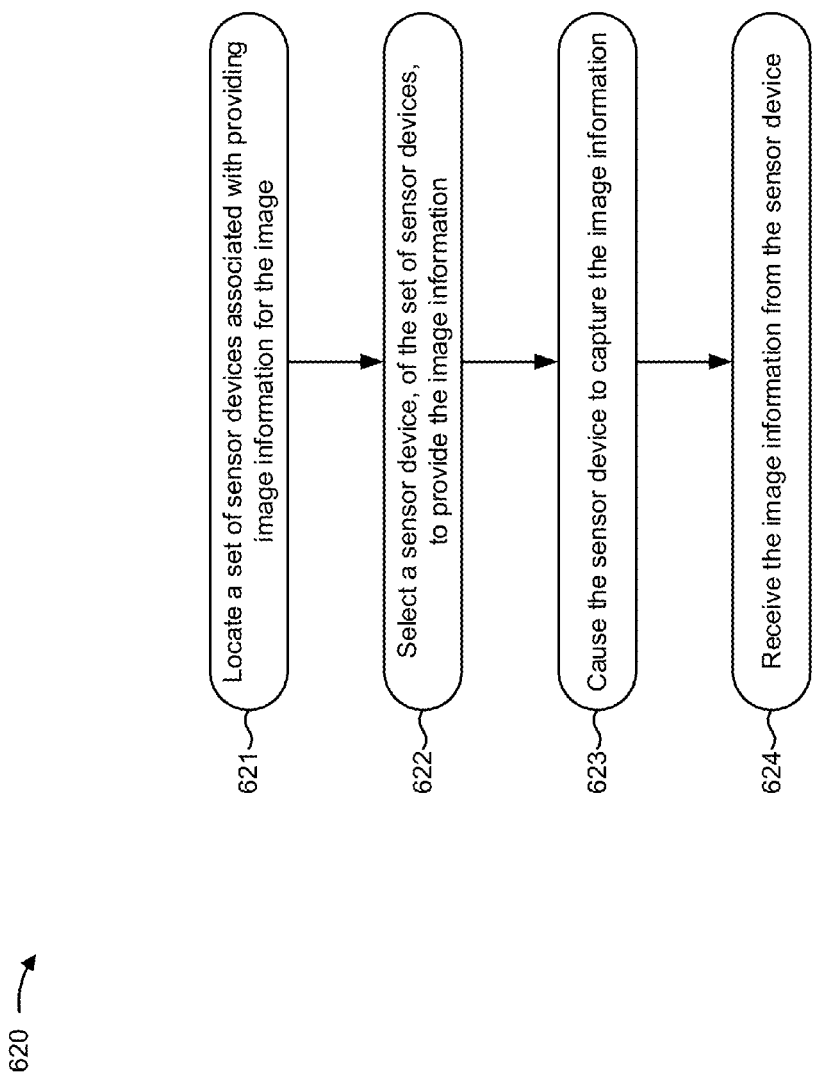

FIGS. 6A and 6B are a flow chart of an example process 600 for providing image information. In some implementations, one or more process blocks of FIGS. 6A and 6B may be performed by image server 230. In some implementations, one or more process blocks of FIGS. 6A and 6B may be performed by another device or a group of devices separate from or including image server 230, such as sensor device 210, sensor platform 220, and user device 240.

As shown in FIG. 6A, process 600 may include receiving a request for an image (block 610). For example, image server 230 may receive the request for the image (e.g., a photographic image, video image, or the like) from user device 240. In some implementations, image server 230 may receive a request for the image that includes a set of criteria for the image. For example, image server 230 may receive a request that indicates a location, a time of day, an image orientation, an image quality, or the like. In some implementations, image server 230 may receive information requesting a set of images. For example, when user device 240 is associated with an autonomous vehicle, image server 230 may receive a particular request for a particular set of images identifying traffic conditions (e.g., other automobiles, traffic signals, or the like) associated with a particular route. In some implementations, image server 230 may receive a request for periodic imaging. For example, when user device 240 is associated with providing security monitoring for a user, image server 230 may receive a request that an image be provided of a particular location, and that the image be updated with a new image according to a particular schedule (e.g., each hour, each day, etc.).

In some implementations, image server 230 may receive a request for imaging associated with a subject. For example, when user device 240 is associated with a law enforcement agency, image server 230 may receive a request for imaging with facial recognition that captures a particular person (e.g., a criminal suspect, an AMBER Alert victim, or the like), imaging with object recognition that captures a particular object (e.g., a license plate belonging to a stolen automobile, or the like), or the like. In some implementations, image server 230 may receive a request for imaging that is performed in association with a particular weather criteria, such as at a particular temperature, at a particular barometric pressure, at a particular precipitation condition, or the like. Additionally, or alternatively, image server 230 may receive a request for imaging based on a criteria being satisfied. For example, sensor device 210 may determine that a threshold temperature, precipitation, barometric pressure, or the like is being experienced by sensor device 210, and sensor device 210 may provide information to image server 230 associated with generating a request for imaging from sensor device 210.

Additionally, or alternatively, image server 230 may determine one or more criteria associated with an image based on the request. For example, when image server 230 receives a request for imaging of a particular subject, such as a particular person, a particular license plate number, a particular object, or the like, image server 230 may determine a set of locations at which the particular subject may be imaged, and may select one or more locations of the set of locations for an image to be provided to a user to fulfill the request. Additionally, or alternatively, image server 230 may process archived image information and/or near real-time image information to determine one or more images capturing the subject, as discussed herein.

As further shown in FIG. 6A, process 600 may include accessing archived image information and/or near real-time image information associated with the request (block 620). For example, image server 230 may receive image information from an archive and/or receive near real-time image information from sensor device 210. In some implementations, image server 230 may utilize information included in the request (e.g., information identifying a location for the image, information identifying a quality of the image, information identifying a weather condition for the image, or the like) to filter stored images and/or near real-time images. In some implementations, image server 230 may receive multiple images associated with the request. For example, image server 230 may receive multiple images of a location, and may combine the multiple images to generate the image requested by user device 240, as discussed herein with regard to block 630. In some implementations, image server 230 may determine that one or more images need to be captured by sensor device 210 to fulfill the request, and may cause the one or more images to be captured, as discussed herein. Further details regarding causing sensor device 210 to capture one or more images to fulfill the request will be discussed herein with regard to FIG. 6B.

As further shown in FIG. 6A, process 600 may include processing the archived image information and/or the near real-time image information (block 630). For example, image server 230 may process the archived image information and/or the near real-time image information associated with the request. In some implementations, image server 230 may process image information to determine an image score for an image (e.g., a measurement of an extent to which the image matches the request). For example, image server 230 may determine one or more image scores for one or more images, and may determine which image to provide based on the one or more image scores. In some implementations, image server 230 may generate an image based on the one or more image scores. For example, image server 230 may determine that a particular image score does not satisfy a threshold, and may combine multiple images to generate a composite image with an image score that does satisfy the threshold.

Image server 230 may process the image to determine one or more objects captured by the image, in some implementations. For example, image server 230 may perform a computer vision technique to identify one or more objects in the image, in some implementations. Additionally, or alternatively, image server 230 may perform a computer vision technique to determine one or more differences between two images (e.g., two images of the same location captured at two different times). In this way, image server 230 may facilitate home security monitoring, automobile security monitoring, coastal erosion monitoring, or the like.

Image server 230 may generate calibration information based on determining one or more objects captured by the image, in some implementations. For example, image server 230 may extract attributes from the image, such as a set of pixel values, and may classify sets of pixels of the image according to the attributes. The calibration information may be associated with causing sensor device 210 to be repositioned when sensor device 210 captures additional images, thereby improving image quality, decreasing signal to noise ratio in captured sensor information, or the like.

Image server 230 may generate another image when processing image information, in some implementations. For example, image server 230 may digitally combine a first image and a second image to generate a composite image. Additionally, or alternatively, image server 230 may process the image to generate another image with another resolution, another contrast, or the like. Additionally, or alternatively, image server 230 may obfuscate an image when processing image information. For example, image server 230 may determine one or more private aspects of an image, such as a face, a house number, a vehicle, a person, an animal, a license plate, or the like, and may obfuscate the one or more private aspects of the image to prevent inadvertent disclosure of private information. Additionally, or alternatively, image server 230 may determine whether a user possesses sufficient credentials for an image that includes one or more private aspects. For example, image server 230 may reject a request from a user for an image that includes private information when the user is not associated with law enforcement. Additionally, or alternatively, image server 230 may require a user, requesting the image, to provide credentials verifying a legal right to receive the image based on processing the image and determining that one or more private aspects are included in the image.

As further shown in FIG. 6A, process 600 may include providing the image to fulfill the request for the image based on processing the archived image information and/or the near real-time image information (block 640). For example, image server 230 may provide the image to user device 240 to fulfill the request for the image. In some implementations, image server 230 may provide a stored image from an archive. Additionally, or alternatively, image server 230 may provide a near real-time image. Additionally, or alternatively, image server 230 may provide a generated image based on one or more images (e.g., one or more archived images, one or more near real-time images, an archived image and a near real-time image, or the like). In some implementations, image server 230 may provide information associated with the image, such as image classifier information, an image score associated with the image, or the like. For example, image server 230 may provide a set of images of a driving route, and may provide associated information identifying traffic signals of the driving route for use by an autonomous vehicle associated with user device 240.

As shown in FIG. 6B, process block 620 may include locating a set of sensor devices associated with providing image information for the image (block 621). For example, image server 230 may locate set of sensor devices 210 associated with providing image information to fulfill the request. In some implementations, image server 230 may receive information identifying locations for the set of sensor devices 210. For example, image server 230 may request and receive (e.g., from a network device, of network 250, associated with determining a location of sensor devices 210 and/or sensor platform(s) 220 including sensor devices 210) information identifying the set of sensor devices 210 within a particular proximity of the location for which imaging is requested. Additionally, or alternatively, image server 230 may request and receive information identifying the set of sensor devices 210 for which a weather condition matches a requested weather condition.

As further shown in FIG. 6B, process block 620 may include selecting a sensor device, of the set of sensor devices, to provide the image information (block 622). For example, image server 230 may select sensor device 210, of the set of sensor devices 210, to perform imaging to fulfill the request. In some implementations, image server 230 may cause sensor device 210 to be moved to the location, near the location, or the like. For example, image server 230 may instruct a particular sensor platform 220 (e.g., a vehicle) that includes sensor device 210 to move to the location so that sensor device 210 may image the location. In some implementations, image server 230 may provide an incentive for sensor device 210 to perform imaging. For example, image server 230 may facilitate user device 240 providing compensation (e.g., monetary compensation, or the like) for sensor device 210 and/or sensor platform 220 to perform the imaging. In this case, image server 230 may select sensor device 210 based on sensor device 210 accepting a transaction with user device 240, sensor device 210 bidding a particular amount for performing imaging for user device 240, or the like.

In some implementations, image server 230 may select sensor device 210 based on one or more attributes of sensor device 210, such as a camera resolution attribute, a camera type, a sensitivity attribute (e.g., an accuracy with which a measurement may be performed), or the like. For example, image server 230 may select sensor device 210 based on sensor device 210 being associated with capturing higher resolution images than another sensor device 210. Additionally, or alternatively, image server 230 may select sensor device 210 based on a proximity of sensor device 210 to a particular location that is to be imaged. For example, image server 230 may determine that a first sensor device 210 is located closer to the particular location that is to be imaged as compared with a second sensor device 210. Additionally, or alternatively, image server 230 may select sensor device 210 based on a direction of travel of sensor device 210 (i.e., a direction of travel associated with sensor platform 220). For example, image server 230 may determine that sensor platform 220 is traveling toward the particular location, and may select sensor device 210 to provide imaging of the particular location based on sensor platform 220 traveling toward the particular location. Additionally, or alternatively, image server 230 may determine a suitability score for sensor platform 220 and/or a set of sensor devices 210 associated with sensor platform 220. For example, image server 230 may determine a suitability score based on the set of sensors 210 associated with sensor platform 220, a location of sensor platform 220, an orientation of sensor platform 220, or the like, and may select sensor 210 based on the suitability score for sensor platform 220.

As further shown in FIG. 6B, process block 620 may include causing the sensor device to capture the image information (block 623). For example, image server 230 may cause sensor device 210 to capture the image information. In some implementations, image server 230 may provide information to sensor device 210 indicating image information that sensor device 210 is to capture. For example, image server 230 may provide an indication of a location, a direction, an orientation, or the like, associated with an image to be captured, and sensor device 210 may capture the image based on the indication. In some implementations, image server 230 may provide information to sensor platform 220 to cause sensor device 210 to capture the image information. For example, image server 230 may provide a set of instructions to sensor platform 220 and sensor 210 indicating that sensor platform 220 is to travel to a particular location at which image information is to be captured and sensor 210 is to capture a particular quantity of images at the particular location. In this case, based on the instructions, sensor platform 220 may travel to the particular location and sensor device 210 may capture the particular quantity of images. Additionally, or alternatively, image server 230 may cause sensor device 210 to capture other image information, such as weather information, location information, orientation information, or the like.

As further shown in FIG. 6B, process block 620 may include receiving the image information from the sensor device (block 624). For example, image server 230 may receive the image information, such as an image, information associated with the image, other sensor information, or the like, from sensor device 210. In some implementations, image server 230 may process the received image information, and may store the received image information, as described herein with regard to FIG. 4.

Although FIGS. 6A and 6B shows example blocks of process 600, in some implementations, process 600 may include additional blocks, fewer blocks, different blocks, or differently arranged blocks than those depicted in FIGS. 6A and 6B. Additionally, or alternatively, two or more of the blocks of process 600 may be performed in parallel.

FIGS. 7A-7D are diagrams of an example implementation 700 relating to example process 600 shown in FIGS. 6A and 6B. FIGS. 7A-7D show an example of providing image information to fulfill a request.

Figure 7A:
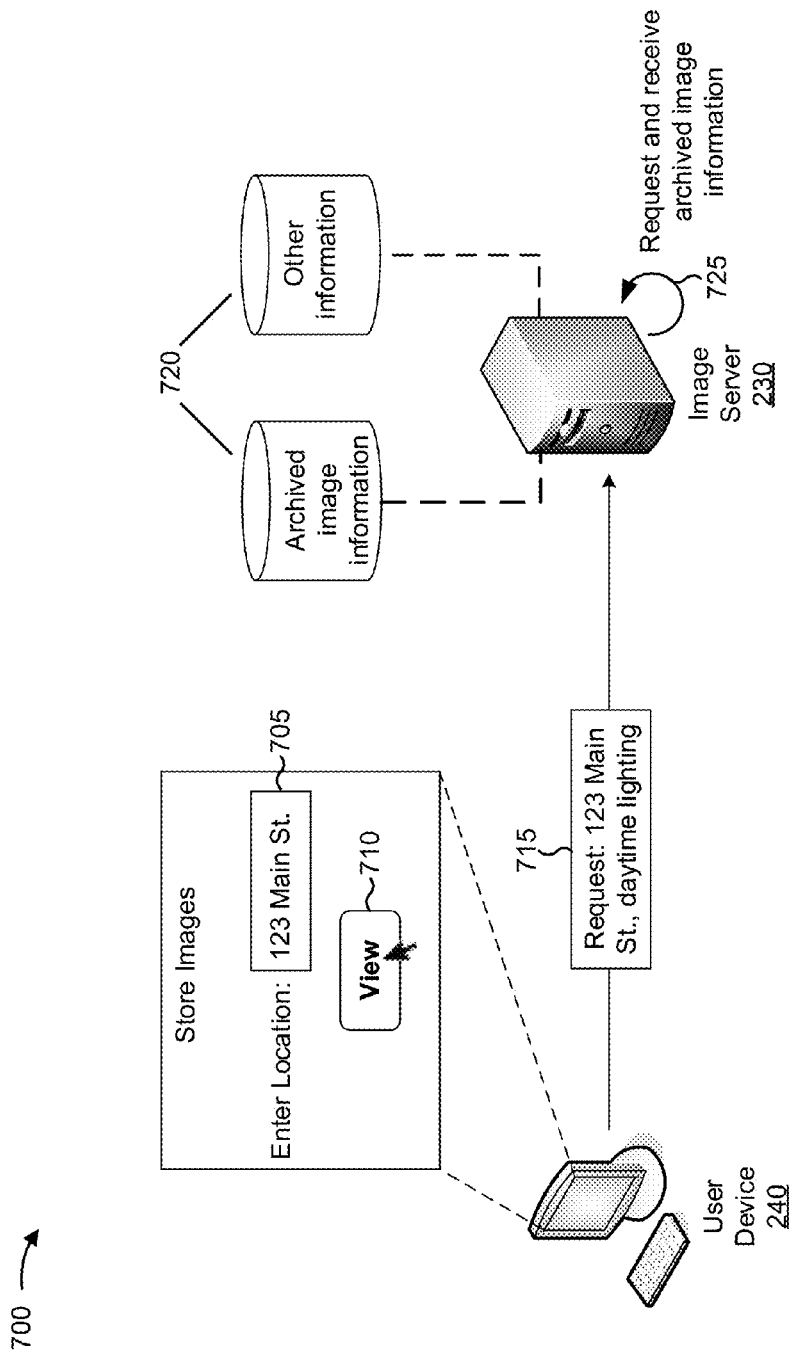
FIGS. 7A-7D are diagrams of an example implementation relating to the example process shown in FIG. 6.

As shown in FIG. 7A, and by reference number 705, a user may input information identifying a location for which imaging is desired. As shown by reference number 710, based on user interaction with a button of a user interface, the user may request that image server 230 provide imaging of the location. Assume that the user intends to view an image of the location captured during daylight. As shown by reference number 715, user device 240 provides the request for imaging to image server 230. As shown by reference number 720, image server 230 includes a repository of archived image information and a repository of other information (e.g., information identifying sensor platform 220 locations, information identifying bidding amounts associated with incentivizing imaging, information identifying image quality parameters associated with available sensor devices 210, or the like), and as shown by reference number 725, image server 230 requests and receives archived image information associated with the location.

Figure 7B:
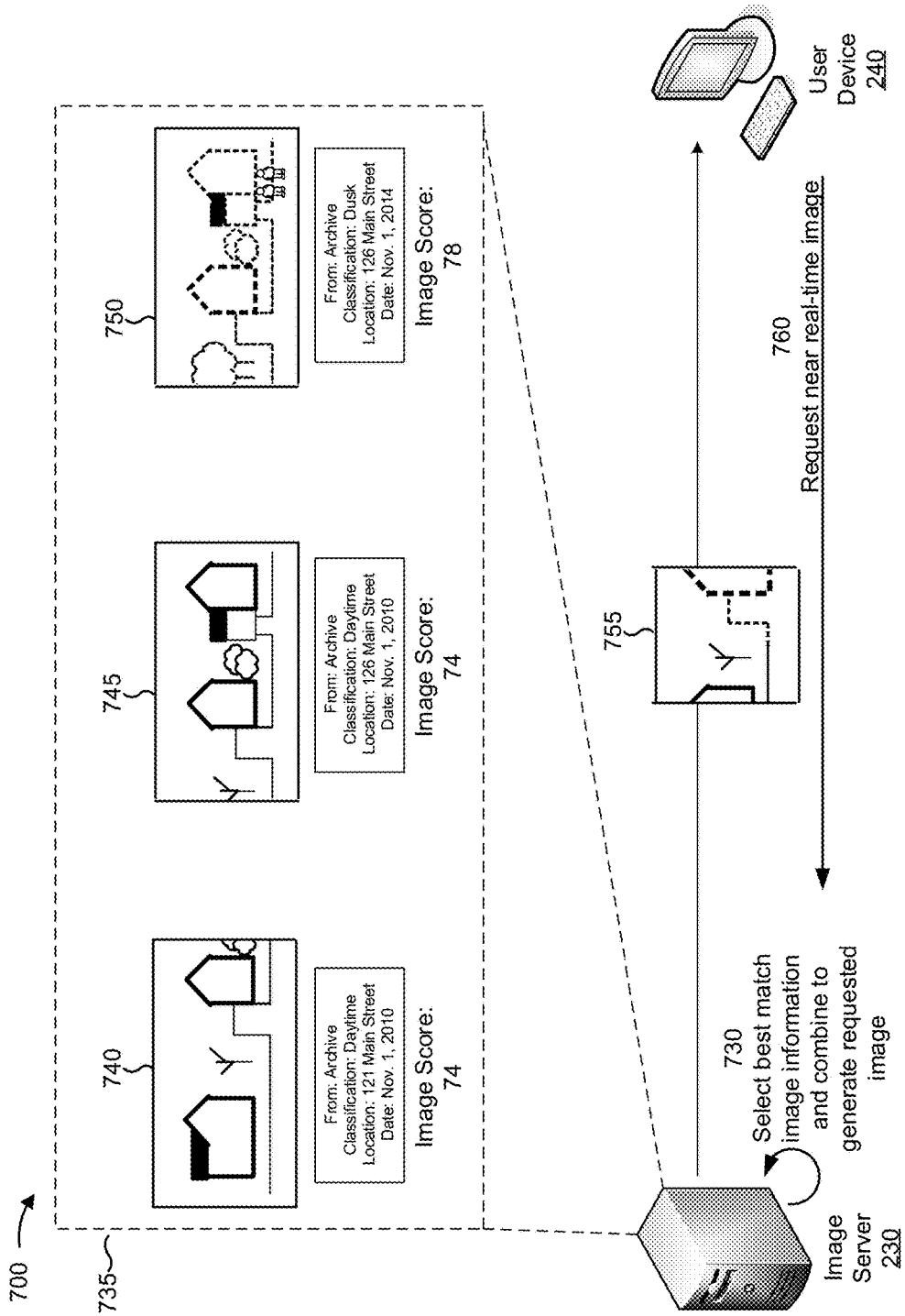

As shown in FIG. 7B, and by reference number 730, image server 230 selects, from a set of archived images, imaging that best matches the request. For example, as shown by reference number 735, image server 230 may receive, from the repository of archived image information, a set of three images associated with the location. As shown by reference numbers 740, 745, and 750, image server 230 may determine an image score for each image of the set of three images, representing an extent to which each image matches the request. Assume that image server 230, determines that none of the image scores satisfy an image score threshold, and determines to combine multiple images to generate a composite image to fulfill the request. As shown by reference number 755, image server 230 provides the composite image to user device 240 to fulfill the request. Assume that the user determines that the image does not suitably fulfill the request. As shown by reference number 760, user device 240 requests that a near real-time image of the location be captured.

Figure 7C:
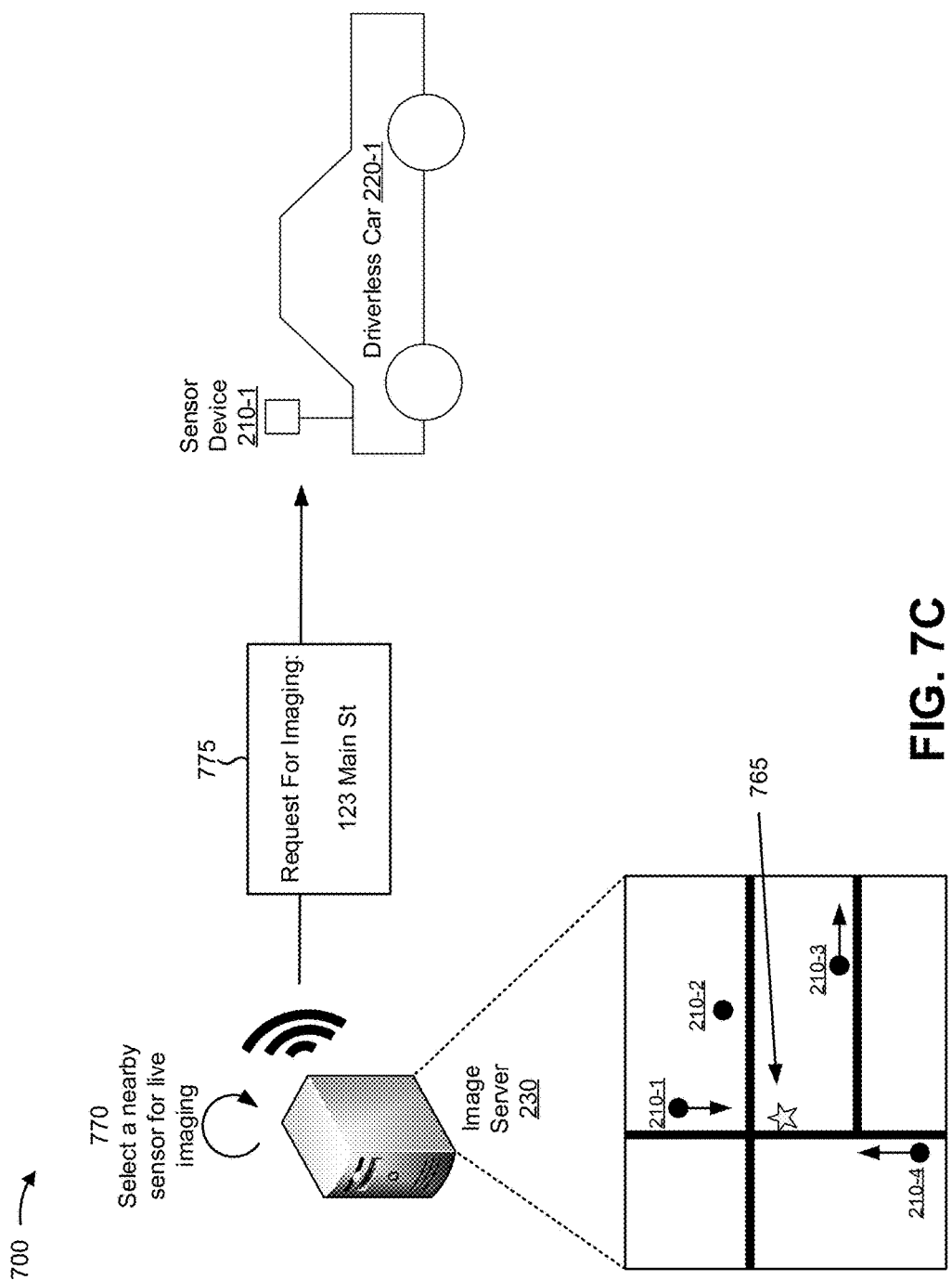

As shown in FIG. 7C, and by reference number 765, image server 230 plots a set of sensor devices 210 on a map of the particular location that is to be imaged. Assume that sensor device 210-1 is associated with driverless car 220-1 (e.g., a particular sensor platform that includes sensor device 210-1), which is traveling towards the particular location and which is within a particular proximity to the particular location. Assume that sensor device 210-2 is associated with a fixed sensor platform 220-2 and is unable to travel to the particular location, sensor device 210-3 is associated with another driverless car 220-3 but is not traveling toward the particular location, and sensor device 210-4 is associated with unmanned aerial vehicle 220-4 and is unable to provide street-level imaging due to altitude restrictions. Consequently, assume that sensor device 210-2, sensor device 210-3, and sensor device 210-4 are determined to be comparatively less suitable for providing the requested near real-time image of the location than sensor device 210-1. As shown by reference number 770, image server 230 selects sensor device 210-1 for capturing an image of the location based on driverless car 220-1 traveling toward the particular location, being located within the particular proximity of the location, and based on sensor devices 210-2, sensor device 210-3, and sensor device 210-4 being comparatively less suitable for providing the requested near real-time imaging of the location than sensor device 210-1. As shown by reference number 775, image server 230 transmits a request for imaging to sensor device 210-1 and to driverless car 220-1 that includes information identifying the location (e.g., a street address). Assume that driverless car 220-1 moves sensor device 210-1 to the street address, sensor device 210-1 captures an updated image of the location, and sensor device 210-1 transmits the updated image to image server 230.

Figure 7D:
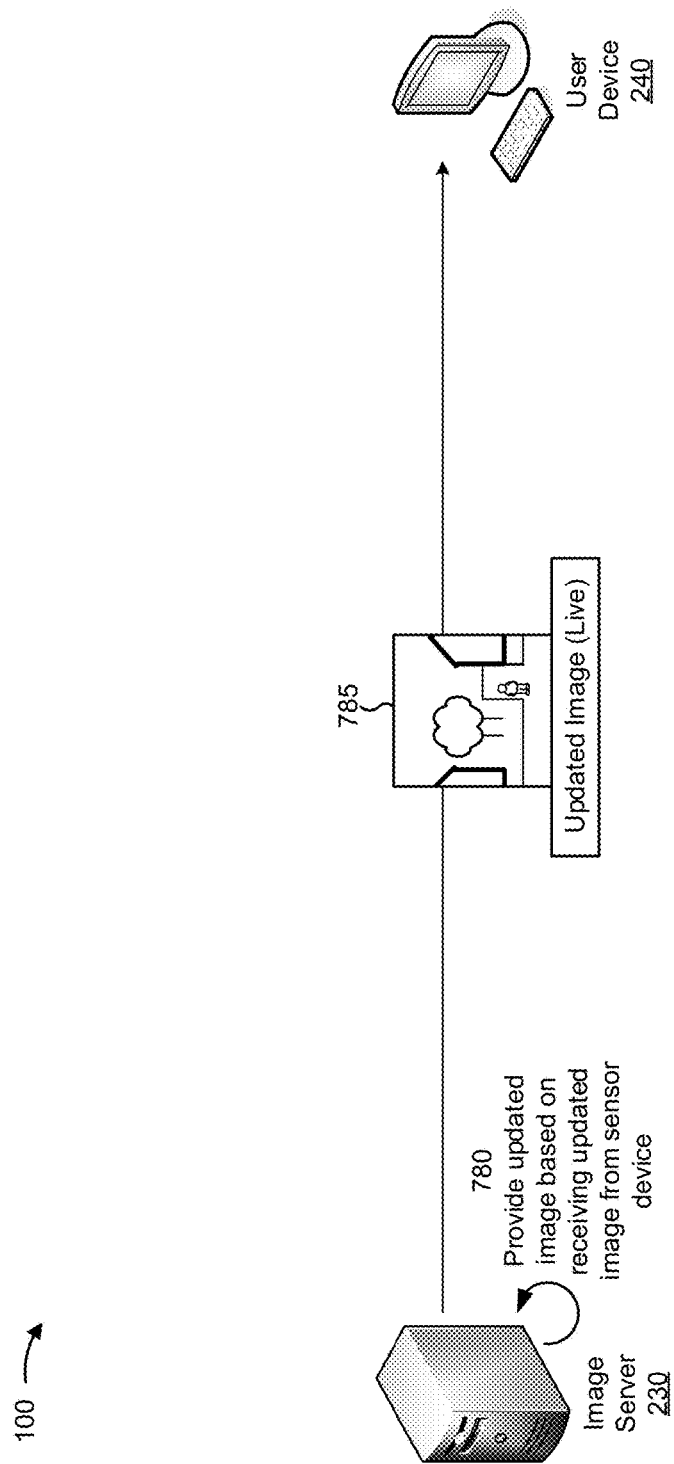

As shown in FIG. 7D, and by reference number 780, image server 230 transmits the updated image to user device 240 in near real-time based on receiving the image from sensor device 210-1. As shown by reference number 785, user device 240 receives the image via the transmission from image server 230.

As indicated above, FIGS. 7A-7D are provided merely as an example. Other examples are possible and may differ from what was described with regard to FIGS. 7A-7D.

In this way, an image server may provide archived and/or near real-time imaging of a requested location using a set of stored images and/or by causing an autonomous vehicle and an associated sensor device to image the requested location.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information regarding individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption, obfuscation, and anonymization techniques for particularly sensitive information. Access to personal information may be subject to applicable privacy laws and oversight policies.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising: one or more processors to:
   identify one or more sensors associated with imaging a particular location;
   select a sensor, of the one or more sensors, for imaging the particular location,
   an autonomous vehicle including the sensor;
   cause the autonomous vehicle to move to the particular location;
   receive a first image of the particular location, from the sensor, based on causing the autonomous vehicle to move to the particular location;
   receive a request for an image of the particular location, the request including a set of criteria for a requested image;
   access a set of images based on receiving the request, the set of images including the first image;
   determine scores for each image of the set of images based on accessing the set of images,
      the scores indicating an extent to which each image of the set of images matches the request
   selectively combine, based on determining that the scores do not satisfy a threshold, the first image with a second image of the set of images to produce a composite image of the particular location that satisfies the set of criteria,
      the second image being an archived image; and
   provide the composite image of the particular location to fulfill the request based on selectively combining the first image with the second image.

2. The device of claim 1, where the one or more processors are further to:
   identify a set of autonomous vehicles associated with the one or more sensors; and
   determine a set of locations for the set of autonomous vehicles,
      the set of autonomous vehicles including the autonomous vehicle; and
   where the one or more processors, when selecting the sensor, are to:
      select the sensor based on a location, of the set of locations, of the autonomous vehicle and the particular location.

3. The device of claim 1, where the one or more processors are further to:
   identify a set of autonomous vehicles associated with the one or more sensors,
      the set of autonomous vehicles including the autonomous vehicle; and
   determine a respective direction of travel of the set of autonomous vehicles; and
   where the one or more processors, when selecting the sensor, are to:
      select the sensor based on the respective direction of travel of the set of autonomous vehicles.

4. The device of claim 1, where the one or more processors are further to:
   identify a set of sensor attributes associated with the one or more sensors; and
   where the one or more processors, when selecting the sensor, are to:
      select the sensor based on the set of sensor attributes associated with the one or more sensors.

5. The device of claim 1, where the one or more processors are further to:
   provide an offer of compensation for performing imaging to fulfill the request; and
   receive an acceptance of the offer of compensation based on providing the offer of compensation; and
   where the one or more processors, when selecting the sensor, are to:
      select the sensor based on receiving the acceptance of the offer of compensation.

6. The device of claim 1, where the one or more processors are further to:
request a set of bids regarding compensation for performing imaging to fulfill the request;
receive a particular bid based on requesting the set of bids, the particular bid being associated with the sensor; and
select the particular bid based on a set of bid criteria; and
where the one or more processors, when selecting the sensor, are to:
select the sensor based on selecting the particular bid.

7. The device of claim 1, where the one or more processors are further to:
receive image information including contextual information associated with classifying the set of images;
process the image information to associate the contextual information with the set of images; and
store the processed image information via an archive.

8. A method, comprising:
identifying, by a device, one or more sensors associated with imaging a particular location;
selecting, by the device, a sensor of the one or more sensors for imaging the particular location,
an autonomous vehicle including the sensor;
causing, by the device, the autonomous vehicle to move to the particular location;
receiving, by the device, a first image of the particular location, from the sensor, based on causing the autonomous vehicle to move to the particular location;
receiving, by the device, a request for an image of the particular location,
the request including a set of criteria for a requested image;
accessing, by the device, a set of images based on receiving the request,
the set of images including the first image;
determining, by the device, scores for each image of the set of images based on accessing the set of images,
the scores indicating an extent to which each image of the set of images matches the request;
selectively combining, by the device and based on determining that the scores do not satisfy a threshold, the first image with a second image to produce a composite image of the particular location that satisfies the set of criteria,
the second image being an archived image; and
providing, by the device, the composite image of the particular location to fulfill the request based on selectively combining the first image with the second image.

9. The method of claim 8, further comprising:
identifying a set of autonomous vehicles associated with the one or more sensors; and
determining a set of locations for the set of autonomous vehicles,
the set of autonomous vehicles including the autonomous vehicle; and
where selecting the sensor comprises:
selecting the sensor based on a location, of the set of locations, of the autonomous vehicle and the particular location.

10. The method of claim 8, further comprising:
identifying a set of autonomous vehicles associated with the one or more sensors,
the set of autonomous vehicles including the autonomous vehicle; and
determining a respective direction of travel of the set of autonomous vehicles; and
where selecting the sensor comprises:
selecting the sensor based on the respective direction of travel of the set of autonomous vehicles.

11. The method of claim 8, further comprising:
identifying a set of sensor attributes associated with the one or more sensors; and
where selecting the sensor comprises:
selecting the sensor based on the set of sensor attributes associated with the one or more sensors.

12. The method of claim 8, further comprising:
providing an offer of compensation for performing imaging to fulfill the request; and
receiving an acceptance of the offer of compensation based on providing the offer of compensation; and
where the selecting the sensor comprises:
selecting the sensor based on receiving the acceptance of the offer of compensation.

13. The method of claim 8, further comprising:
requesting a set of bids regarding compensation for performing imaging to fulfill the request;
receiving a particular bid based on requesting the set of bids,
the particular bid being associated with the sensor; and
selecting the particular bid based on a set of bid criteria; and
where selecting the sensor comprises:
selecting the sensor based on selecting the particular bid.

14. The method of claim 8, further comprising:
receiving image information including contextual information associated with classifying the set of images;
processing the image information to associate the contextual information with the set of images; and
storing the processed image information via an archive.

15. A non-transitory computer-readable medium storing instructions, the instructions comprising:
one or more instructions that, when executed by one or more processors, cause the one or more processors to:
identify one or more sensors associated with imaging a particular location;
select a sensor, of the one or more sensors, for imaging the particular location,
an autonomous vehicle including the sensor;
cause the autonomous vehicle to move to the particular location;
receive a first image of the particular location, from the sensor, based on causing the autonomous vehicle to move to the particular location;
receive a request for an image of the particular location,
the request including a set of criteria for a requested image;
access a set of images based on receiving the request,
the set of images including the first image;
determine scores for each image of the set of images based on accessing the set of images,
the scores indicating an extent to which each image of the set of images matches the request
selectively combine, based on determining that the scores do not satisfy a threshold, the first image with a second image to produce a composite image of the particular location that satisfies the set of criteria,
the second image being an archived image; and
provide the composite image of the particular location to fulfill the request based on selectively combining the first image with the second image.

16. The non-transitory computer-readable medium of claim 15, where the one or more instructions, when executed by the one or more processors, further cause the one or more processors to:
- identify a set of autonomous vehicles associated with the one or more sensors; and
- determine a set of locations for the set of autonomous vehicles,
  - the set of autonomous vehicles including the autonomous vehicle; and
- where the one or more instructions, that cause the one or more processors to select the sensor, cause the one or more processors to:
  - select the sensor based on a location, of the set of locations, of the autonomous vehicle and the particular location.

17. The non-transitory computer-readable medium of claim 15, where the one or more instructions, when executed by the one or more processors, further cause the one or more processors to:
- identify a set of autonomous vehicles associated with the one or more sensors,
  - the set of autonomous vehicles including the autonomous vehicle; and
- determine a respective direction of travel of the set of autonomous vehicles; and
- where the one or more instructions, that cause the one or more processors to select the sensor, cause the one or more processors to:
  - select the sensor based on the respective direction of travel of the set of autonomous vehicles.

18. The non-transitory computer-readable medium of claim 15, where the one or more instructions, when executed by the one or more processors, further cause the one or more processors to:
- identify a set of sensor attributes associated with the one or more sensors; and
- where the one or more instructions, that cause the one or more processors to select the sensor, cause the one or more processors to:
  - select the sensor based on the set of sensor attributes associated with the one or more sensors.

19. The non-transitory computer-readable medium of claim 15, where the one or more instructions, when executed by the one or more processors, further cause the one or more processors to:
- provide an offer of compensation for performing imaging to fulfill the request; and
- receive an acceptance of the offer of compensation based on providing the offer of compensation; and
- where the one or more instructions, that cause the one or more processors to select the sensor, cause the one or more processors to:
  - select the sensor based on receiving the acceptance of the offer of compensation.

20. The non-transitory computer-readable medium of claim 15, where the one or more instructions, when executed by the one or more processors, further cause the-one or more processors to:
- request a set of bids regarding compensation for performing imaging to fulfill the request;
- receive a particular bid based on requesting the set of bids, the particular bid being associated with the sensor; and
- select the particular bid based on a set of bid criteria; and
- where the one or more instructions, that cause the one or more processors to select the sensor, cause the one or more processors to:
  - select the sensor based on selecting the particular bid.

* * * * *